A. GUYOT.
PROCESS FOR THE PREPARATION OF ACETIC ALDEHYDE FROM ACETYLENE.
APPLICATION FILED APR. 25, 1918.
1,343,715.
Patented June 15, 1920.
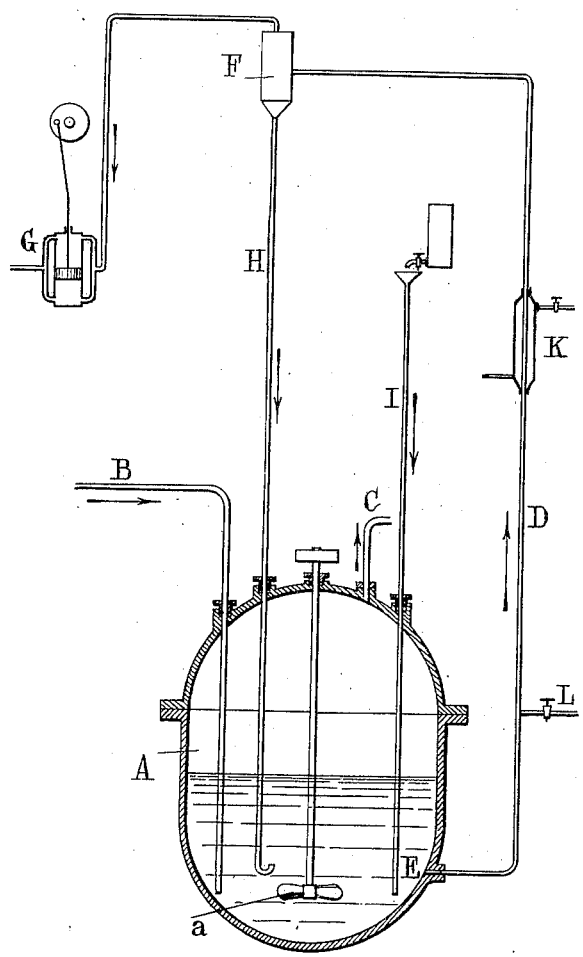
INVENTOR
ALFRED GUYOT
BY Howson and Howson
ATTORNEYS

UNITED STATES PATENT OFFICE.

ALFRED GUYOT, OF SALINDRES, FRANCE, ASSIGNOR TO COMPAGNIE DES PRODUITS CHIMIQUES D'ALAIS ET DE LA CAMARGUE, OF SALINDRES, FRANCE, A CORPORATION OF FRANCE.

PROCESS FOR THE PREPARATION OF ACETIC ALDEHYDE FROM ACETYLENE.

1,343,715.   Specification of Letters Patent.   Patented June 15, 1920.

Application filed April 25, 1918. Serial No. 230,765.

*To all whom it may concern:*

Be it known that I, ALFRED GUYOT, a citizen of the Republic of France, and a resident of Salindres, Department of Gard, France, have invented new and useful Improvements in Processes for the Preparation of Acetic Aldehyde from Acetylene, of which the following is a specification.

It is known that acetylene is capable of fixing a molecule of water so as to afford acetic aldehyde.

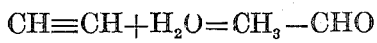

This hydration which takes place already directly although very laboriously, when the two components are heated under pressure to 300° C. (Degrez) is facilitated by the presence of certain catalyzers such as sulfuric acid (Erdmann, Köthner), the salts of zinc or of cadmium and more particularly the salts of mercury (Kutscherow), alone or in the presence of acids.

Nevertheless, the use of these catalyzers presents grave inconveniences; they polymerize a part of the aldehyde formed or transform it into aldol, into crotonic aldehyde and other products of condensation, not well known, which color the liquid and are deposited in the form of resins upon the walls of the receiver in which the reaction is effected; moreover, when one operates in the presence of salts of mercury, the aldehyde exercises a reducing action upon the salt, of which it sets the metal at liberty. There results from all these facts a corresponding loss of aldehyde and a rapid diminution of the mass of the catalyzer, which must be frequently renewed.

It has been attempted to combat these inconveniences in various ways; choice of a suitable temperature and of a suitable concentration of acid,—substitution for sulfuric acid of other acids such as the sulfonic acids, phosphoric acid, etc.,—addition of certain salts such as the sulfate of soda, which render the aldehyde insoluble proportionately to its formation and thus remove it, at least partially, from the action of the liquid,—addition of certain solvents such as ether, naphtha, etc., which secure the aldehyde and protect it by a similar mechanism, etc.

In this sequence of ideas, may be cited the process which forms the subject of French Patent No. 475183 dated July 16th, 1914. It consists in causing to pass into the midst of the hydrating reagent an excess of acetylene which carries along the aldehyde in proportion to its formation and thus maintains at a very low figure the richness in aldehyde of the reactionary liquid.

Lastly, there has been mentioned the employment of a vacuum to eliminate the aldehyde from the medium wherein it is created (French patent dated January 20th, 1911, No. 425,057). The process described in this patent consists essentially in submitting the liquid serving for the hydration alternately to two distinct phases of treatment; saturation by acetylene, then elimination by the action of the vacuum of the aldehyde formed. In this process, there thus exists a phase in the operation in which the liquid is rich in aldehyde, a circumstance eminently favorable to its alteration as well as to that of the catalyzer employed.

The present invention, on the contrary, eliminates the inconveniences resulting from the employment of the different processes above mentioned. It consists essentially in submitting in a continuous manner, to the action of a vacuum, the solution of salt of mercury in sulfuric or other acid serving for the hydration of the acetylene with a view to eliminating therefrom the acetic aldehyde in proportion to its formation.

Many arrangements can be designed to effect the extraction of the aldehyde as a continuous process by the use of a vaccum. Nevertheless they must be such that the acetylene which enters into the liquid serving for the hydration shall not be subjected to the influence of the vacuum, otherwise it might pass through the liquid without being fixed. It is, therefore, only by way of example that an arrangement, complying with this condition is shown in the annexed drawing.

The reaction vessel A, into which the acetylene enters by the tube B is furnished with a powerful agitator *a*. The residual foreign gases and the small amount of acetylene not absorbed by the reaction escape by the tube C. A small tube D connected at the point E below the level of the liquid in the reaction chamber A connects the latter with a second receptacle F arranged above the reaction chamber and subjected to a partial vacuum by the pump G. The vacuum is greater or less, depending upon the height at which the vessel F is arranged above the reaction chamber A. A second tube B of greater diameter than that of the tube D opens adjacent the bottom of the reaction chamber and forms the inlet for the reaction liquid contained within the chamber A. This reaction liquid may, for example, be a solution of salt of mercury in sulfuric acid.

When the process is in operation the vacuum produced by the pump G sucks the liquid from the reaction chamber A to the same elevation in tubes D and H and causes the escape into these two tubes of gaseous bubbles comprising solely a mixture of water vapor and of the vapor of acetic aldehyde. However, whereas these gaseous bubbles are freely liberated in the tube H of greater diameter, they cause, by reason of the less diameter of the tube K, a continuous entrainment of the liquid in the tube K toward the chamber F, and this liquid returns to the reaction chamber A through the tube H after it has been freed in the chamber F of the major part of the aldehyde, and it is chilled in the chamber F under the influence of this rapid evaporation. The gaseous bubbles which are disengaged in the tube H disappear after the apparatus has been in operation a few moments, since this tube is constantly washed by the liquid returning from the chamber F to the reaction chamber A, after having been freed of aldehyde and been partially chilled by its passage into, and evaporation in, the chamber F. A rapid circulation of the liquid is thus established through the closed circuit A, D, F, H, A in the direction indicated by the arrows. By reason of this rapid circulation and the continuous elimination of the aldehyde in the chamber F the content of aldehyde in the liquid in the reaction chamber remains always very small, a condition essential to prevent the alteration of the aldehyde.

The vapors which reach the pump G, comprising vapors of water and aldehyde, are there brought to atmospheric pressure. They are liquefied by this pressure and are discharged by the pump as an aqueous solution and concentrate with pure aldehyde.

The pipe I serves as an inlet for water to replace that entering into reaction or lost by the evaporation. The steam jacket K surrounding the pipe D serves to re-heat the liquid, thus facilitating its rise in the tube D, especially at the start of the operation.

For the same purpose a tube L may be opened to the tube D to permit the entry of air. A valve controls this air inlet so that the supply may be shut off or admitted when needed to assist in the upward movement of the liquid in the pipe D by reason of the emulsion formed as a result of the air addition. When the circulation has been established it continues automatically in the direction indicated by the arrows, and the heating pipe D about the steam jacket K may be omitted.

The continuous circulation of the liquid in the direction of the arrows between the receptacles A and F may be accomplished or facilitated by mechanical means, or in any other manner.

Having now particularly described and ascertained the nature of my said invention and in what manner the same is to be performed, I declare that what I claim is:—

1. A process for the preparation of acetic aldehyde by hydration of acetylene in the presence of a catalyzer, which comprises establishing a continuous circulation of the reaction liquid through a circuit including the reaction chamber, and withdrawing the acetic aldehyde from the reaction liquid during its passage through said circuit and at a point exterior to the reaction chamber.

2. A process for the preparation of acetic aldehyde by hydration of acetylene in the presence of a catalyzer, which comprises establishing a continuous circulation of the reaction liquid by a partial vacuum through a circuit including the reaction chamber, and withdrawing the acetic aldehyde from the reaction liquid during its passage through said circuit and at a point exterior to the reaction chamber.

3. A process for the preparation of acetic aldehyde by hydration of acetylene in the presence of a catalyzer, which comprises introducing acetylene into the reaction liquid in a reaction chamber, withdrawing the liquid from the reaction chamber to a separating chamber, withdrawing acetic aldehyde from the reaction liquid by a partial vacuum in said separation chamber and returning to the reaction chamber the reaction liquid chilled by the evaporation of the acetic aldehyde in the separation chamber.

4. A process for the preparation of acetic aldehyde by hydration of acetylene in the presence of a catalyzer, which comprises introducing acetylene into the reaction liquid in a reaction chamber, withdrawing the liquid from the reaction chamber to a separating chamber by a partial vacuum therein, leading to a recovery apparatus the acetic aldehyde vapors withdrawn from the reaction liquid by the vacuum in said separation chamber and returning the chilled reaction liquid by gravity from the separation chamber to the reaction chamber.

5. In a process such as specified in claim 4, assisting the establishment of said circulation of the reaction liquid by introducing air into the liquid at a point in the circuit exterior to the reaction chamber.

6. In a process such as specified in claim 4, assisting the establishment of said circulation of the reaction liquid by heating the liquid at a point in the circuit exterior to the reaction chamber.

In testimony whereof I have signed my name to this specification in the presence of two subscribing witnesses.

ALFRED GUYOT.

Witnesses:
  H. CARTIEZ,
  A. YEAZ.